Feb. 15, 1966 W. F. BARTLETT ETAL 3,235,667
CALL TRANSFER CIRCUIT
Filed Aug. 31, 1962 2 Sheets-Sheet 1

INVENTORS.
WILLIAM F. BARTLETT
ADAM A. JORGENSEN
BY WILLIAM A. OSWALD
George W. Killian
AGENT Feb. 15, 1966 W. F. BARTLETT ETAL 3,235,667

CALL TRANSFER CIRCUIT

Filed Aug. 31, 1962

2 Sheets-Sheet 2

| | |
|---|---|
| STATION 1 | TRANSFEROR STATION |
| STATION 2 | CALLING STATION |
| STATION 3 | TRANSFEREE STATION |
| CODE 6 | SIGNALS INITIATION OF TRANSFER COMMAND |
| TIME SLOT 4 | ASSIGNED TRANSFEROR STATION |
| TIME SLOT 5 | ASSIGNED CALLING STATION |

3,235,667
CALL TRANSFER CIRCUIT

William F. Bartlett, Rochester, Adam A. Jorgensen, Victor, and William A. Oswald, Rochester, N.Y., assignors, by mesne assignments, to Stromberg-Carlson Corporation, Rochester, N.Y., a corporation of Delaware Filed Aug. 31, 1962, Ser. No. 220,687
23 Claims. (Cl. 179—18)

This invention relates in general to automatic communication systems and, more particularly, to automatic communication systems of the time division multiplex type.

Although the invention herein disclosed is suitable for more general application, it is particularly adapted for use in automatic telephone communication systems. In such systems, it has been the practice to provide a number of features and services for the convenience of the users of the system in addition to the mere completion of a voice transmission path. Some common features which make telephone service more useful include line lock-out, executive right-of-way, direct inward dialing to PBX extensions, intercept service, camp-on-busy, trunk hunting, toll ticketing, and time, temperature and weather announcements. In addition, prior to the advent of automatic, or dial operated, telephone systems, it was possible to give the manual operator special instructions. For example, the operator might have been asked to complete calls only after a certain time, or only from certain people, or the operator might have been requested to transfer all calls for a first party to a second party's line. Although this last type of transfer operation may be very convenient and desirable, it has not been economically practical to provide such transfer service in dial operated systems heretofore.

It is the general object of this invention to provide a new and improved telephone system.

It is a more particular object of this invention to provide a new and improved telephone system wherein facilities are included to complete connections to one station although originally directed to another station.

It is another object of this invention to provide facilities in a communication system which respond to directive signals from a first station to transfer any connections directed to said first station to a selected alternate station.

It is another object of this invention to provide transfer facilities in a time division multiplex communication system.

It is a more specific object of this invention to provide facilities in a time division multiplex communication system for completing communication connections to a preassigned station when directed to some other station.

Modern communication systems have been designed employing time division multiplex principles. For example, the patent application of W. F. Bartlett et al., Serial No. 45,341, filed July 26, 1960, now Patent No. 3,171,896, and assigned to the same assignee as the present invention, describes in detail the operation of a time division multiplex communication system. In the manner more fully set forth in the cited application, the calling line store has registered therein information indicative of the identity of calling lines. The registration is in the form of circulating time slot pulses in a plurality of delay lines, and the coded signals indicative of individual calling lines emerge from the delay line registers once in each repetitive time frame in the time slot assigned to the calling line. In a similar manner, the terminating line store has registered therein information indicative of the identity of called lines. The registration in the terminating line store is similar in form to the registration in the calling line store. That is, the information is registered in the form of circulating time slot pulses in delay lines, and coded signals indicative of an individual called line emerge from the delay line registers once in each repetitive time frame in the time slot assigned to the calling line.

In addition to the calling line store and terminating line store, there is provided a line number counter which comprises a plurality of ring connected binary flip-flop circuits which are driven one step every second time frame. Therefore, the line number counter provides output signals for a duration of two time frames and has the capacity to produce output signals indicative of any of the designations of the called or calling lines, and certain other coded signals. The output signals for each step of the line number counter are compared with all the output pulses from the calling line store and the terminating line store for at least one time frame. A pair of comparators performs this comparison and, when an identity of output signals from the line number counter and either the calling line store or terminating line store occurs, the appropriate comparator produces an output signal.

In accordance with the illustrated embodiment of the present invention and as described in the cited application, there is provided a calling line store, a terminating line store, a line number counter, and a pair of comparators. When a first party desires to have calls directed to his station transferred to another station, the first party will dial a pre-assigned code followed by the designation of the other party's station. Thereafter, any calls directed to the first station will be automatically transferred to the other station.

Further objects and advantages of the invention will become apparent as the following description proceeds, and features of novelty which characterize the invention will be pointed out in particularity in the claims annexed to and forming a part of this specification.

For a better understanding of the invention, reference may be had to the accompanying drawings in which.

Figure 1:
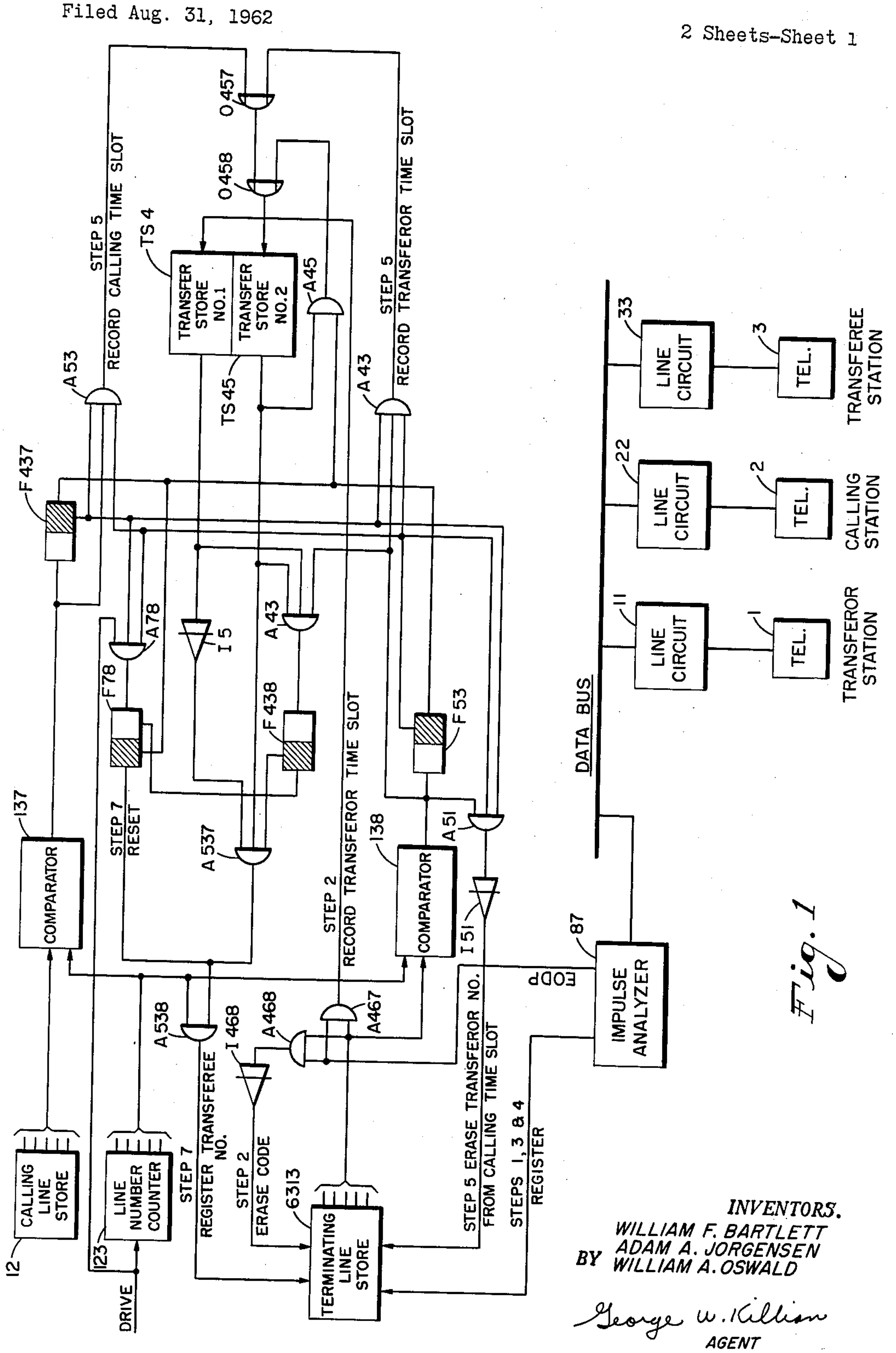
FIG. 1 shows a logic diagram of a system incorporating the invention.

It is to be understood that only the details of the circuits necessary to understand the invention have been shown. For example, the circuit details of dynamic and static registers, gates, amplifiers, inverters, and flip-flop circuits have been omitted as it is believed that the inclusion of such details, which are well known to those skilled in the art, would only tend to mask or obscure the invention disclosed and described herein. Typical circuit details for logic symbols shown herein are well known to those skilled in the art, and are shown and described in the cited Bartlett et al. application.

AND gates are represented in the drawings by a symbol which has the general shape of a D. The inputs to an AND gate are drawn to the straight line part of the D while the output is drawn from the arcuate portion of the D. All the AND gates illustrated in the drawings are of the type that will provide a negative output potential only when all the inputs are negative. When any one or more of the inputs to an AND gate are positive, the output potential will rise to a more positive potential.

OR gates are similar in appearance to AND gates but are distinguished therefrom by having the input leads extend beyond the straight line portion of the D and to the arcuate portion. All the OR gates illustrated in the drawings are of the type that will provide a negative output potential when one or more of the inputs are negative. When all of the inputs to an OR gate are positive, the output potential will rise to a more positive potential.

Flip-flop circuits are represented by a rectangle divided into two squares, to represent the two portions of a typical flip-flop circuit. The square representing the reset portion of the flip-flop is shaded while the square representing the set portion of the flip-flops is not shaded. The input signals to reset or set the flip-flops are applied to the shorter sides of the rectangle. The flip-flops used in the illustration are of the type which respond only to positive transients of input signals. When a flip-flop has been reset by a positive transient, a steady state ground marking potential is provided on an output lead from the reset side of the flip-flop and a steady state negative marking potential is provided on an output lead from the set side of the flip-flop. When the flip-flop is set, the marking potentials on the output leads are reversed.

Inverters are represented by an isosceles triangle having a line parallel to the base and of approximately the same length as the base and intersecting the sides approximately midway between the base and the apex of the triangle. The input to the inverters is at the base of the triangle, while the output is from the apex. The inverters used in the illustrated embodiment of the invention provide a ground or positive output signal when the input signal is negative and provides a negative output signal when the input signal is positive.

The calling line store and terminating line store are similar to the elements of the same name in the cited application which provides a detailed description of said circuits, the manner of storing the information therein, and the output signals therefrom. It should be understood that the calling and terminating line stores include dynamic registers, such as circulating delay line registers, which provide time slot output pulses on a binary basis on selected ones of a plurality of output leads.

A line number counter is illustrated which, like the calling and terminating line stores, produces a binary output signal. The line number counter is driven one step every second time frame and maintains a constant output signal between successive drive pulses.

Two comparators are provided, one each for the calling and terminating line stores. The comparator associated with the calling line store will produce a time slot output signal only when the calling line store and the line number counter have identical output signals on all of their respective output leads. Since the line number counter maintains a given output signal for two time frames, the comparator will produce two output pulses when any time slot of the calling line store has registered therein a number corresponding to the setting of the line number counter. In a similar manner, the compartor associated with the terminating line store will produce time slot output signals only when the terminating line store has output signals that are identical to the output signal of the line number counter.

The application of Glenn R. Richards, Serial No. 185,-386, filed April 5, 1962, now abandoned, and assigned to the same assignee as the present application, provides further information concerning the calling and terminating line stores, the comparators, and the line number counter.

Transfer stores 1 and 2 comprise a dynamic register such as a circulating delay line having a time delay of one time frame. Transfer store 1 is used for registering time slot signals indicative of stations which have requested transfer service. Transfer store 2 registers time slot signals indicative of the time slots assigned the transferor and calling stations of the specific connection being transferred.

Figure 2:
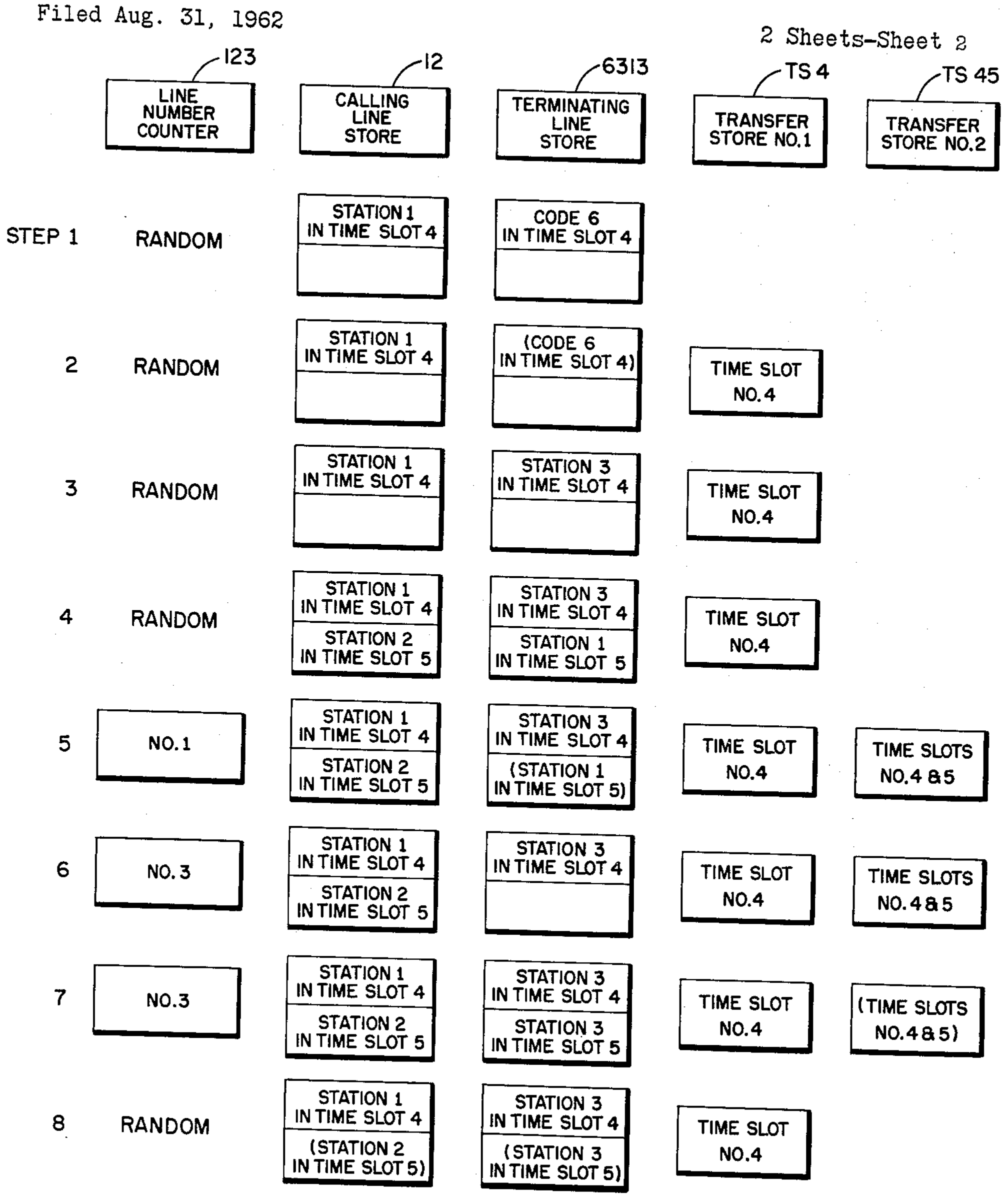
FIG. 2 shows the step-by-step changes in the registrations in certain register circuits as the transfer connection is set up and completed.

It is believed that the operation of the system can best be understood by first considering FIG. 2 which shows the step-by-step changes in the information registered in certain circuits as the transfer connection is set up and completed. In order to provide a convenient description of the step-by-step operation of this invention in conjunction with the drawings, the following assumptions and number and time slot allotments will be made.

First, the designation of the transferor station, the station whose calls are to be transferred, will be assumed to be station 1.

Second, station 1 will be presumed to have been assigned time slot 4 when station 1 went off-hook.

Third, the transferee station, the station to which party 1's calls are to be transferred, will be station 3.

Fourth, the calling party attempting to call station 1 will be presumed to be station 2.

Fifth, station 2 will be presumed to have been assigned time slot 5 when station 2 went off-hook.

Sixth, the necessary code to initiate a transfer is the digit "6."

Of course, it is to be understood that in a practical system the designations of the various stations would almost necessarily include more than one digit. Furthermore, although it is stated in the sixth assumption that the code digit "6" is required to initiate the transfer action, any other suitable code might be employed or, in some systems, the transfer might be initiated by the dialing of the designation assigned to the initiating station. The choice of method for initiating the transfer is one of preference and convenience, not one dictated by design principles.

Referring now to FIG. 2, there is illustrated therein five columns wherein the first column represents the line number counter 123; the second column, the calling line store 12; the third column, the terminating line store 6313; the fourth column, transfer store 1 TS4; and the fifth column, transfer store 2 TS45. Written within the boxes, in horizontal rows representing the step-by-step operation, is an indication of the registration of the information registered in the various circuits. When the information is included in parentheses it is an indication that that information is removed, or erased, during that step.

*Step one.*—When the transferor station (station 1) goes off-hook, that station will be assigned time slot 4 and, therefore, signals indicative of station 1 will be registered in time slot 4 of the calling line store 123. In response to directive signals from station 1, code 6 will be registered in time slot 4 of the terminating line store 6313. The line number counter 123 will be at a random count and no information will be registered in either of the transfer stores.

*Step two.*—The system will recognize the registration of code 6 in the terminating line store and, in response thereto, a pulse in time slot 4 will be registered in transfer store 1 and the code 6 will be erased from the time slot 4 of the terminating line store.

*Step three.*—In response to further directive signals from station 1, the designation of the transferee station (station 3) will be registered in time slot 4 of the terminating line store.

Station 1 may now disconnect; however, the registrations in the calling line store, terminating line store, and transfer store 1 remain and any calls directed to station 1 will automatically be transferred to station 3.

*Step four.*—When the calling station (station 2) goes off-hook to originate a call to station 1, the designation of station 2 will be registered in time slot 5 of the calling line store. In response to directive signals from station 2, the designation of station 1 will be registered in the fifth time slot of the terminating line store.

*Step five.*—When the line number counter advances to a count corresponding to station 1, pulses will be recorded in transfer store 2 in time slots 4 and 5. Time slot 4 is, therefore, registered in both transfer stores. Concurrent with the registration of time slot pulse 5 in transfer store 2, the designation of station 1 in time slot 5 of the terminating line store will be erased.

*Step six.*—The line number counter will advance to number 3 and will remain on number 3 for two time frames. During the first time frame, the circuits will perform tasks to determine if the line number counter is set to the step corresponding to the designation of the transferee station. More specifically, a static memory will be set to indicate that the setting of the line number counter corresponds to the registration in time slot 4 of the terminating line store and that, therefore, the setting of the line number counter should be transferred to time slot 5 of the terminating line store.

*Step seven.*—During the second time frame that the line number counter is on step 3, the registration of the line number counter will be transferred, in time slot 5, to the terminating line store, and the time slot pulses in transfer store 2 will be erased.

The calling station (station 2) is now connected to the transferee station (station 3) through a voice communication channel in time slot 5 of the time division multiplex system.

*Step eight.*—In response to disconnect signals from stations 2 and 3, the registrations in time slot 5 of both the calling line store and terminating line store will be erased. The registrations in time slot 4 of the calling line store and terminating line store, as well as the registration of the pulse in time slot 4 of the transfer store 1, will remain until erased in response to directive signals from station 1.

*Detailed description*

The components and logic elements illustrated in FIGS. 1 and 2 have been given designations which are intended to facilitate an understanding of the operation of this invention. As stated, the invention will be described with the previously enumerated station and time slot assignments assumed. The designations assigned indicate various things, such as which numbers are registered in the various stores, or which time slots pass through the various gate circuits. For example, AND gate A43 passes a pulse in time slot 4 when the line number counter is on step 3; calling line store 12 will have numbers 1 and 2 registered therein; the terminating line store 6313 will have the digits 6, 3, 1 and 3 registered therein at various times; and flip-flop F53 will be set by a pulse in time slot 5 when the line number counter 123 is set to number 3. Designating digits other than the digits "1"–"6" have been used for distinguishing purposes. For example, flip-flops F437 and F438 are both set by a pulse in time slot 4 when the line number counter 123 is set to number 3 and, therefore, the digits "7" and "8" are used to distinguish between them. The prefixes A, F, I, and O are used for AND gates, flip-flops, inverters and OR gates, respectively.

When a subscriber at telephone 1, which is connected to line circuit 11, goes off-hook, time slot 4 will be assigned to that station and dial tone will be returned in the manner more fully described in the cited Bartlett et al. application. The subscriber will proceed to dial the code 6 to indicate his desire to have calls directed to his station transferred to some other station. The code 6 will be registered in time slot 4 (the time slot assigned station 1, the transferor station) of the terminating line store 6313. Upon receipt of an end-of-digit pulse on the lead designated EODP from the impulse analyzer 87, a pulse will be gated in time slot 4 through AND gate A467 to transfer store TS4 to register the fact that the station assigned time slot 4 has initiated a transfer command. In addition, the same end-of-digit pulse will be gated through AND gate A468 and inverter I468 to erase the code 6 from the terminating line store 6313.

AND gate A467 will pass the time slot 4 pulse to transfer store TS4 only when the output of the dynamic registers included in the terminating line store 6313 indicates that the code 6 is registered therein. More specifically, AND gate A467 is enabled only when the binary output signals from terminating line store 6313 have binary 6 registered in one of the time slots. It was mentioned that the code for indicating the initiation of a transfer registration might be the directory number of the transferor station rather than an arbitrary code. If the directory number system is used, the technique for gating the appropriate time slot pulse to transfer store TS4 will be slightly different. Instead of providing a gate, such as gate A467, which is enabled only when the terminating line store 6313 has registered therein the proper code, the line number counter 123, the calling line store 12, and the comparators 137 and 138 will be employed. In a typical system employing this technique, there may be one hundred time slots in a 100-microsecond time frame and, since the line number counter 123 changes its registration only once every second time frame (once every 200 microseconds), the line number counter can go through each one of 1000 different registrations in 0.2 second. If, within the 0.2 second cycle, the comparators note that both the calling line store 12 and the terminating line store 6313 have the same number registered therein, in a given time slot, a pulse will be gated to transfer store TS4 indicative of said given time slot. Accordingly, with whichever system is used, a time slot pulse will be registered in transfer store TS4 which indicates the time slot assigned to the transferor station.

To summarize, the calling line store 12 has registered therein, in time slot 4, the designation of station 1; the transfer store TS4 has a pulse registered therein, in time slot 4; and the code 6, which was registered in the terminating line store 6313 in time slot 4, has been erased.

The party at telephone 1 will proceed to dial the designation of the transferee station (station 3) to which his calls are to be transferred. The designation 3 will be registered in the fourth time slot of the terminating line store 6313. Normally, the registration of a called number in the terminating line store causes a test to be performed, in the manner more fully described in the cited Bartlett et al. application, to determine if that station is busy. If the called station is not busy, ringing would normally commence on the called line. However, in this case, the ringing of station 3 is not desired and is inhibited by an output pulse in time slot 4 of the transfer store TS4. Party 1 may now disconnect and thereafter any calls directed to station 1 will be automatically transferred to station 3. To summarize, there is registered in time slot 4 of the calling line store 12 and terminating line store 6313 codes indicative of stations 1 and 3, respectively, and a time slot 4 pulse is registered in transfer store TS4.

When a calling subscriber at station 2 goes off-hook to originate a connection to station 1, station 2 will, according to the assumptions stated above, be assigned time slot 5 and the identity of station 2 will be registered in time slot 5 of the calling line store 12. In response to directive pulses from station 2, the identity of station 1 will be registered in time slot 5 of the terminating line store 631 in the manner more fully described in the cited Bartlett et al. application. Upon receipt of an end-of-digit pulse, the comparators 137 and 138 will start to compare the time slot registrations in both the calling line store 12 and the terminating line store 6313 with the successive settings of the line number counter 123. It should be recalled that the line number counter 123 changes its output signals only once every two time frames. If the comparator 137 detects that the calling line store 12 has registered therein, in any time slot, a number corresponding to the setting of the line number counter 123, flip-flop F437 will be set; and if the comparator 138 detects that the terminating line store 6313 has registered therein, in any time slot, a number corresponding to the setting of the line number 123, flip-flop F53 will be set. In the event that only the calling line store 12 or the terminating line store 6313 has a registration therein, in one of the time slots, corresponding to the setting of the line number counter 123, then only one of the flip-flops F437 or F53 will be set. It will be shown later that the pulses which drive the line number counter 123 are also used to reset the two flip-flops F437 and F53. When both flip-flops F437 and F53 are set, it is an indication that the line number counter 123 is set to the transferor number (1). When the line number counter 123 is set to the transferor number, then both flip-flops F437 and F53 will be set during the first time frame. It will be observed that with flip-flops F437 and F53 set, enabling potentials will be provided to AND gates A53, A78, A43 and A51. When both the flip-flops F437 and F53 have been set, the next pulse from comparator 138, which will be produced in the time slot wherein the registration in terminating line store 6313 agrees with the setting of line number counter 123, will pass through enabled AND gate A43 and through OR gates O457 and O458 in series to transfer store TS45. In addition, during the second time frame that the line number counter 123 is set to 1, a time slot pulse in time slot 4 will be produced at the output of comparator 137 and this pulse will pass through enabled AND gate A53 and OR gates O457 and O458 in series to transfer store TS45. More specifically, transfer store TS45 will have registered therein, in time slots 4 and 5, pulses indicative of the time slots assigned to the transferor and calling stations, respectively. It should be recalled that transfer store TS4 already has registered therein a time slot pulse in time slot 4. In addition, transfer store TS4 may have registered therein other time slot pulses indicative of the time slots assigned to other stations which have initiated a transfer command.

The setting of flip-flops F437 and F53 provide an enabling potential for AND gate A51. During the second time frame that the line number counter is set to the number corresponding to the transferor number, the comparator 138 will recognize that the transferor number is registered in the fifth time slot of the terminating line store 6313 and the same time slot pulse that was entered in transfer store TS45 will be passed through AND gate A51 and be inverted by inverter I51 to erase the transferor number from the calling time slot. The erasure of the transferor number from the calling time slot in the terminating line store 6313 is necessary in order to permit the number of the transferee station to be transferred to the terminating line store in the calling time slot. This transfer will take place when the line number counter 123 is found to be set to the transferee number (3) as indicated by the setting of the line number counter 123 corresponding to the registration in the terminating line store in the transferor time slot (4). More specifically, in the illustrated case, when the line number counter is set to number 3, the comparator 138 will produce an output pulse in time slot 4 to indicate that the line number counter is set to the number to which station 1's calls are to be transferred.

At the end of the second time frame that the line number counter 123 is set to number 1, a drive pulse on the lead, designated DRIVE, will advance the line number counter to number 2. The same drive pulse will also pass thorugh enabled AND gate A78 to set flip-flop F78. The setting of flip-flop F78 resets flip-flops F437 and F53. In addition, the setting of flip-flop F78 provides an enabling to AND gate A45 to permit the output pulses from transfer store TS45 to be recirculated. Although AND gate A45 is not enabled until after pulses have been entered in transfer store TS45, both the pulses registered therein will be recirculated because AND gate A45 will be enabled within one time frame after the pulses have been entered in transfer store TS45, which has a time delay of one time frame. It is important to understand that only two time slot pulses are entered in transfer store TS45 at any one time; one time slot pulse indicative of the time slot assigned the transferor station, and the other pulse indicative of the time slot assigned the calling station. Furthermore, it should be recalled that a time slot indicative of the time slot assigned the transferor station is registered in both transfer stores.

The line number counter 123 will advance step-by-step every second time frame. Eventually, the line number counter 123 will be advanced to the setting corresponding to the designation of the transferee station (station 3). During the first time frame that the line number counter is set to this step, the transferor time slot pulse will emerge from the transfer stores TS4 and TS45 and, simultaneously therewith, the comparator 138 will recognize that the terminating line store 6313 has registered therein, in time slot 4, the number corresponding to the setting of the line number counter 123 and, therefore, AND gate A43 will be enabled to pass a pulse to set flip-flop F438. The setting of flip-flop F438 will provide an enabling potential to AND gate A537. Subsequently, when a negative time slot pulse emerges from transfer store TS45 without a corresponding negative time slot pulse emerging from transfer store TS4, a pulse will be passed through AND gate A537 to AND gate A538. Inverter I5 is used to prevent the negative output pulse in time slot 4 from transfer store TS4 from passing through AND gate A537 and to invert the positive output pulse of transfer store TS4 in time slot 5 to a negative output pulse so that a time slot 5 pulse can be passed through AND gate A537. It will be observed that the setting of the line number counter provides an enabling potential to selected ones of a plurality of AND gates represented by AND gate A538. The enabled AND gate A538 provides an indication of the instantaneous setting of the line number counter 123. Therefore, the pulse passed through AND gate A537 will pass through AND gate A538 to transfer the setting of the line number counter 123 to the terminating line store 6313 in the time slot of the calling station (time slot 5). In addition, the time slot pulse passed through AND gate A537 will be used to reset flip-flop F78, thereby inhibiting AND gate A45 to prevent the further recirculation of the time slot pulses in transfer store TS45. In addition, the resetting of flip-flop F78 will reset flip-flop F438 to inhibit AND gate A537. The resetting of flip-flop F78 also removes the reset signal from flip-flops F437 and F53, thereby removing the transfer inhibiting signal and permitting other calls waiting transfer to set these flip-flops and enter their respective transferor and calling time slots in transfer store TS45.

With the transferee number transferred from the line number counter 123 to the terminating line store 6313 in the calling time slot 5, a busy test of the transferee line will be made in the manner fully explained in the cited Bartlett et al. patent application, and if the transferee line is idle, ringing will be started and, in response to an answer supervisory signal from the transferee station, a communication connection will be completed between the calling station and the transferee station. In response to disconnect signals from the two stations, the communication connection will be broken and the registrations in the calling time slot in calling line store 12 and the terminating line store 6313 are erased in the same manner as that set forth in the cited Bartlett et al. application.

Of course, the registration of the transferor designation and time slot remain in the calling line store 12 and transfer store TS4, respectively, and the designation of the transferee station remains registered in the transferor times slot (4) of the terminating line store 6313.

When the transferor party desires to have calls directed to his station received thereat, he can dial a signal to terminate the transfer. The transfer signal, like the initiation signal, may be either an arbitrary code or the designation of the transmitting station. In either event, the registration of the directive digits will cause the cancellation of the transfer command, return all circuits to normal, and erase all the registrations which were required to effect a transfer. The techniques for erasing the signals are believed to be well known to those skilled in the art and/or fully explained in the cited patent application and, therefore, are not illustrated in the drawings of this application as it is believed that it would only tend to make an understanding of this invention more difficult.

While there has been shown and described what is considered at present to be the preferred embodiment of the invention, modifications thereto will readily occur to those skilled in the art. It is not desired, therefore, that the invention be limited to the embodiment shown and described, and it is intended to cover in the appended claims all such modifications as fall within the true spirit and scope of the invention.

What is claimed is:

1. In a communication system, a plurality of communicating channels connected to said system including a transferor, a transferee, and a calling channel, each of said channels having an individual coded designation, means connected to each channel for transmitting supervisory and directive signals to said system, central register means connected to said system for registering said signals, first means coupled to said channels responsive to predetermined signals including the coded designation of said transferee channel from said transferor channel for transmitting the designations of said transferor and said transferee channels to said register means for registration therein, said first means responsive to signals including the coded designation of said transferor channel from said calling channel for transmitting the designations of said transferor and said calling channels to said register means for registration therein, and second means responsive to the concurrent registration of the designation of said transferor channel in response to said signals from said transferor and said calling channels for completing a communication connection between said calling and said transferee channels, wherein said communication system comprises a time division multiplex system and wherein said central register means includes means for registering said directive signals in individual time slots in a repetitive time frame.

2. The combination as set forth in claim 1 wherein the registration of said transferor and transferee designations are registered in a first time slot of said register means in response to said signals from said transferor channel and wherein the registration of said calling and transferor designations are registered in a second time slot of said register means in response to said signals from said calling channel.

3. The combination as set forth in claim 2 wherein said second means includes means for removing the registration of said transferor designation from the second time slot of said register means and for substituting therefor a registration indicative of the designation of said transferee channel.

4. The combination as set forth in claim 3 wherein said communication channel between said calling and said transferee channels is completed in said second time slot.

5. The combination as set forth in claim 4 and including means responsive to signals from said calling and said transferee channels for removing the registration of all designations in said second time slot of said register means.

6. In a time division multiplex communication system, a plurality of communicating channels connected to said system including a transferor, a transferee, and a calling channel, each of said channels having an individual coded designation, separate signaling means connected to each channel for transmitting supervisory and directive signals to said system, first and second register means for registering selected ones of said transmitted signals in selected time slots in a repetitive time frame, first means responsive to predetermined signals including the coded designation of said transferee channel from said signaling means connected to said transferor channel for transmitting the designations of said transferor and said transferee channel to said first and second register means, respectively, for registration therein in a first time slot, said first means responsive to signals including the coded designation of said transferor channel from said signaling means connected to said calling channel for transmitting the designations of said calling and said transferor channels to said first and second register means, respectively, for registration therein in a second time slot, and second means responsive to the concurrent registration of the designation of said transferor channels in the first and second time slots of said first and second register means, respectively, for completing a communication connection between said calling and said transferee channels.

7. The combination as set forth in claim 6 wherein the designation of said transferor channel is removed from the second time slot of said second register means, and wherein said second means includes means for registering the designation of said transferee channel in said second time slot of said second register means.

8. The combination as set forth in claim 7 wherein said predetermined signals include a code in addition to the designation of said transferee channel which is registered in said first time slot of said second register means.

9. The combination as set forth in claim 8 wherein said second means includes detection means for producing an output signal only when said second register has said code registered therein.

10. The combination as set forth in claim 9 wherein said second means includes a third register and means for registering a signal in said third register indicative of said first time slot in response to an output signal from said detecting means.

11. The combination as set forth in claim 10 wherein said second means includes a fourth register and means for registering signals indicative of said first and second time slots in said fourth register only when said first and second registers have registered therein the designation of said transferor channels in said first and second time slots, respectively.

12. In a time division multiplex system, first and second dynamic registers, means for registering identical coded information in said first and second registers in first and second time slots, respectively, of a repetitive time frame, first and second comparators connected to said first and second registers, respectively, a ring counter coupled to said comparators and adapted to be sequentially set to correspond to successive ones of any possible registration in said first and second registers, said first and second comparators responsive to said counter being set to the code registered in said first and second time slots of said first and second registers, respectively, for producing output pulses in said first and second time slots, respectively, and control means responsive to said output pulses from said comparators for removing the registration of said coded information from said second time slot in said second register and for substituting therefor different coded information.

13. The combination as forth in claim 12 wherein said first named means includes means for registering definitive coded information in the first time slot of said second register and wherein said different coded information is said definitive coded information.

14. The combination as forth in claim 13 wherein said system comprises a communication system having a transferor and a transferee channel, each channel having an individual coded designation and wherein said identical coded information registered in said first and second time slots of said first and second register, respectively, is indicative of said transferor channel and said definitive coded information is indicative of said transferee channel.

15. The combination as set forth in claim 14 wherein said control means comprise third and fourth dynamic registers and gating means for gating said first and second time slot output pulses of said comparators to said fourth register, and other means for gating a pulse to said third register in said first time slot.

16. The combination as set forth in claim 15 wherein said definitive code is registered in said second time slot of said second register only when said counter is set to said definitive code and in response to an output pulse in said second time slot from said fourth register.

17. The combination as set forth in claim 16 wherein said control means include means for removing the registrations in said fourth register in response to the registration of said definitive code in said second register.

18. In a time division multiplex system, first and second dynamic registers for registering time slot pulses in a repetitive time frame, a transferor, a transferee, and a calling channel, signaling means connected to each channel, means responsive to first signals from said transferor and said calling channels for assigning first and second time slots to said transferor and said calling channels, respectively, means responsive to a predetermined combination of second signals from said transferor and said calling channels for registering said first and second time slot pulses in said second register and said first time slot pulse in said first register, and means responsive to the concurent registration of said first time slot pulse in said first and second registers for completing a communication connection between said calling and said transferee channels.

19. The combination as set forth in claim 18 wherein said communication connection is completed in said second time slot.

20. The combination as set forth in claim 19 wherein means are included for removing the registration of said first and second time slot pulses from said second register in response to the completion of the communication connection between said calling and said transferee channels.

21. In a time division multiplex system, first and second dynamic registers, first means for registering a first code in first and second time slots of a repetitive time frame in said first and second registers, respectively, and for registering a second and third code in said second and first time slots of said first and second registers, respectively, a ring counter adapted to be sequentially set to correspond to successive ones of said first, second, and third codes, and control means responsive to said counter being set to said first code for removing the registration of said first code from said second register and for thereafter substituting the registration of said third code in said second time slot of said second register.

22. The combination as set forth in claim 21 wherein said control means includes means for registering said third code in said second time slot of said second register only when said counter is set to said third code.

23. The combination as set forth in claim 21 wherein said first, second, and third codes are indicative of transferor, calling, and transferee channels, respectively, in a communication system.

References Cited by the Examiner

UNITED STATES PATENTS

| | | | |
|---|---|---|---|
| 2,909,607 | 10/1959 | Nilsson et al. | 179—18 |
| 2,957,047 | 10/1960 | Wennemer | 179—18 |

ROBERT H. ROSE, *Primary Examiner.*

WILLIAM C. COOPER, *Examiner.*